(12) United States Patent
Gallant et al.

(10) Patent No.: US 8,315,593 B2
(45) Date of Patent: *Nov. 20, 2012

(54) METHOD FOR BILLING IN A TELECOMMUNICATIONS NETWORK

(75) Inventors: John K Gallant, Plano, TX (US); Kathleen A McMurry, Richardson, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 511 days.

This patent is subject to a terminal disclaimer.

(21) Appl. No.: 12/178,743

(22) Filed: Jul. 24, 2008

(65) Prior Publication Data

US 2009/0010409 A1    Jan. 8, 2009

Related U.S. Application Data

(63) Continuation of application No. 10/036,667, filed on Dec. 21, 2001, now Pat. No. 7,406,306.

(60) Provisional application No. 60/276,923, filed on Mar. 20, 2001, provisional application No. 60/276,953, filed on Mar. 20, 2001, provisional application No. 60/276,955, filed on Mar. 20, 2001, provisional application No. 60/276,954, filed on Mar. 20, 2001.

(51) Int. Cl.
*H04M 11/00* (2006.01)
*H04M 1/66* (2006.01)
*H04M 15/00* (2006.01)

(52) U.S. Cl. .... 455/406; 455/411; 379/120; 379/127.05

(58) Field of Classification Search .......... 455/406–411; 370/310
See application file for complete search history.

(56) References Cited

U.S. PATENT DOCUMENTS

| | | | |
|---|---|---|---|
| 4,979,207 A | 12/1990 | Baum et al. |
| 5,027,388 A | 6/1991 | Bradshaw et al. |
| 5,565,316 A | 10/1996 | Kershaw et al. |
| 5,579,379 A | 11/1996 | D'Amico et al. |

(Continued)

FOREIGN PATENT DOCUMENTS

EP    1202528    5/2002

(Continued)

OTHER PUBLICATIONS

John K. Gallant et al. "Method for Billing in a Telecommunications Network"; U.S. Appl. No. 10/036,667, filed Dec. 21, 2001; 29 pages.

(Continued)

*Primary Examiner* — Matthew Sams

(57) ABSTRACT

The present invention is directed to a method for placing a call between a client in one network and a client in another network. The IP network includes a SIP server and a network gateway configured to provide access to a public switched network. The method includes receiving a SIP call request message from the first client. The SIP call request message is authenticated to thereby identify an authentic originating client. Subsequently, a database is searched to find client billing tag corresponding to the authentic originating client. The call is completed if the client billing tag is obtained, and not completed if the client billing tag cannot be obtained. Thus, the present invention provides an efficient method for billing phone calls that are placed from SIP enabled devices to a telephone connected to the Public Switched Telephone Network (PSTN). The method of the present invention also substantially eliminates certain types of fraud.

19 Claims, 4 Drawing Sheets

U.S. PATENT DOCUMENTS

| | | | |
|---|---|---|---|
| 5,812,668 | A | 9/1998 | Weber |
| 5,827,070 | A | 10/1998 | Kershaw et al. |
| 5,867,495 | A | 2/1999 | Elliott et al. |
| 6,016,343 | A | 1/2000 | Hogan et al. |
| 6,122,359 | A | 9/2000 | Otto et al. |
| H1897 | H | 10/2000 | Fletcher et al. |
| 6,134,307 | A | 10/2000 | Brouckman et al. |
| 6,151,624 | A | 11/2000 | Teare et al. |
| 6,233,248 | B1 | 5/2001 | Sautter et al. |
| 6,282,193 | B1 | 8/2001 | Hluchyj et al. |
| 6,311,186 | B1 | 10/2001 | MeLampy et al. |
| 6,377,672 | B1 | 4/2002 | Busuioc |
| 6,377,939 | B1 | 4/2002 | Young |
| 6,418,467 | B1 | 7/2002 | Schweitzer et al. |
| 6,490,564 | B1 | 12/2002 | Dodrill et al. |
| 6,499,054 | B1 | 12/2002 | Hesselink et al. |
| 6,577,718 | B1 * | 6/2003 | Kalmanek et al. ....... 379/114.22 |
| 6,611,818 | B1 | 8/2003 | Mersky et al. |
| 6,631,186 | B1 | 10/2003 | Adams et al. |
| 6,639,975 | B1 | 10/2003 | O'Neal et al. |
| 6,707,915 | B1 | 3/2004 | Jobst et al. |
| 6,714,992 | B1 | 3/2004 | Kanojia et al. |
| 6,718,023 | B1 | 4/2004 | Zolotov |
| 6,751,652 | B1 | 6/2004 | Thomas |
| 6,768,722 | B1 | 7/2004 | Katseff et al. |
| 6,865,681 | B2 | 3/2005 | Nuutinen |
| 6,870,845 | B1 | 3/2005 | Bellovin et al. |
| 6,895,438 | B1 | 5/2005 | Ulrich |
| 6,907,032 | B2 | 6/2005 | Eastman |
| 6,952,800 | B1 | 10/2005 | Danner et al. |
| 6,980,526 | B2 | 12/2005 | Jang et al. |
| 7,058,704 | B1 | 6/2006 | Mangipudi et al. |
| 7,076,040 | B2 | 7/2006 | Carson et al. |
| 7,136,467 | B2 | 11/2006 | Brockman et al. |
| 7,197,560 | B2 | 3/2007 | Caslin et al. |
| 7,305,081 | B1 | 12/2007 | Kalmanek, Jr. et al. |
| 7,406,306 | B2 | 7/2008 | Gallant et al. |
| 2001/0012346 | A1 | 8/2001 | Terry |
| 2001/0050984 | A1 | 12/2001 | Jordan |
| 2002/0010798 | A1 | 1/2002 | Ben-Shaul et al. |
| 2002/0064149 | A1 | 5/2002 | Elliott et al. |
| 2002/0090071 | A1 | 7/2002 | Book et al. |
| 2002/0095339 | A1 | 7/2002 | Galloway |
| 2002/0103898 | A1 | 8/2002 | Moyer et al. |
| 2002/0112187 | A1 | 8/2002 | Dalton, Jr. et al. |
| 2002/0123919 | A1 | 9/2002 | Brockman et al. |
| 2002/0124100 | A1 | 9/2002 | Adams |
| 2002/0126654 | A1 | 9/2002 | Preston et al. |
| 2002/0127995 | A1 | 9/2002 | Faccinn et al. |
| 2002/0129093 | A1 | 9/2002 | Donovan et al. |
| 2002/0129236 | A1 | 9/2002 | Nuutinen |
| 2002/0160810 | A1 | 10/2002 | Glitho et al. |
| 2002/0188712 | A1 | 12/2002 | Caslin et al. |
| 2003/0009557 | A1 | 1/2003 | Carson et al. |
| 2003/0074313 | A1 | 4/2003 | McConnell et al. |
| 2003/0079223 | A1 | 4/2003 | Galloway |
| 2003/0126257 | A1 | 7/2003 | Vijay |
| 2004/0078349 | A1 | 4/2004 | Syrjala et al. |
| 2007/0116232 | A1 | 5/2007 | Sprokkereef |
| 2007/0206576 | A1 | 9/2007 | Radulovic |
| 2008/0013531 | A1 | 1/2008 | Elliott et al. |
| 2008/0025295 | A1 | 1/2008 | Elliott et al. |

FOREIGN PATENT DOCUMENTS

| | | |
|---|---|---|
| WO | WO 0052916 A1 | 9/2000 |
| WO | WO 02/075559 A1 | 9/2002 |

OTHER PUBLICATIONS

Handley et al., "SIP: Session Initiation Protocol", IETF Request for Comment 2543, Mar. 1999.

Schulzrinne et al., "SIP call Control Services", IETF Internet Draft, Jun. 17, 1999.

Usdin et al., "XML: Not a Sliver Bullet, but a Great Pipe Wrench", StandardView, Sep. 1998, vol. 6, No. 3, pp. 125.

Schulzrinne et al., "Signaling for Internet Telephony", Columbia University, Department of Computer Science Technical Report CUCS-005-98, Jan. 31, 1998, 27 pages.

Cisco Systems, "Release Note for Cisco MC3810—Software Requirement for Analog Personality Modules", Document No. 78-6053-01, 1998, 2 pages.

Aboba, B. and D. Lidyard "The Accounting Data Interchange Format (ADIF)", ROAMOPS Working Group, Apr. 25, 2000.

Brownlee, N. and A. Blount "RFC 2924—Accounting Attributes and Record Formats", Sep. 2000.

Lennox, J., H. Schulzrinne and T.F. La Porta "Implementing Intelligent Network Services with the Session Initiation Protocol", Columbia University Technical Report CUCS-002-99, Jan. 1999.

Polyzois, CA, H. Purdy, P-F Yang, D. Shrader, H. Sinnreich, F. Menard and H. Schulzrinne "From POTS to PANS—A Commentary on the Evolution to Internet Telephony", Mar. 26, 1999.

Cisco Systems, "Overview of the Session Initiation Protocol," www.cisco.com/univered/c/td/dociproducticoice/sipsols/biggulp/bisipov.htm, Jan. 1, 1992.

Kausar, Nadia, et al., "A Charging Model for Sessions on the Internet," Proceedings of the Fourth IEEE Symposium on Computers and Communications, pp. 32-38, Apr. 1, 1999.

Pan et al., "DIAMETER: Policy and Accounting Extension for SIP (draft-pan-diameter-sip-01)," the Internet Society, Nov. 15, 1998.

Sterman, "Real-Time Billing in SIP," DeltaThree, 2002, www.recursosvoip.comidocsienglish/realtimebilling.pdf, 18 pages, Jan. 1, 2002.

* cited by examiner

METHOD FOR BILLING IN A TELECOMMUNICATIONS NETWORK

RELATED APPLICATIONS

This application is a continuation of U.S. patent application Ser. No. 10/036,667, filed Dec. 21, 2001, which is a non-provisional of 60/276,923, filed Mar. 20, 2001, entitled "IP Communications," U.S. Provisional Patent Application 60/276,953, filed Mar. 20, 2001, entitled "IP Communications," U.S. Provisional Patent Application 60/276/955, filed Mar. 20, 2001, entitled "IP Communications," and U.S. Provisional Patent Application 60/276,954, filed Mar. 20, 2001, entitled "IP Communications," the disclosures of which are incorporated herein by reference.

BACKGROUND OF THE INVENTION

1. Field of the Invention

The present invention relates generally to telecommunications, and particularly to billing SIP-originated communications sessions in an efficient manner.

2. Technical Background

In the context of communications networks, the Session Initiation Protocol (SIP) is an application-layer signaling protocol that has been developed to create, modify, and terminate sessions having one or more users. These sessions include Internet telephone calls, multi-media conferences, and multi-media distribution. SIP has enjoyed wide-spread acceptance as a means for signaling telecommunications services over the Internet since its approval as an official telecommunications standard in 1999.

The main function of SIP is to initiate and terminate interactive communications sessions between users. One requirement of initiating a session involves determining the location of the destination user. The destination user may have a SIP phone at work, a personal computer at both work and home, a non-SIP phone at home, or a mobile phone, among others. A call placed to this user may require the ringing of all devices at once, or there may be call forwarding, or some other feature employed to locate the user. After the destination user is located, SIP conveys the response to the session invitation to the originating user. The response may include either an accept or reject message. If the invitation is accepted the session becomes active. At the conclusion of the session, SIP is used to terminate the session.

The other main function of SIP is to provide the destination user with a description of the session he is being invited to. SIP is not concerned with the details of the session, but does provide information about the protocol used to describe the session. For example, SIP may employ Multipurpose Internet Mail Extension (MIME), the session description protocol (SDP), or some other suitable means to describe the session. SIP can also be used to negotiate a common format to describe a particular session.

One type of telephone call that can be placed by a customer is a call from an IP enabled device to a standard telephone set connected to the Public Switched Telephone Network (PSTN). The IP enabled device communicate to the PSTN via an IP network gateway. The network gateway functions as an interface, providing mediation from a packet switched IP signaling/voice system to the circuit switched, time division multiplexed (TDM) system employed by the PSTN. One problem associated with making these types of calls involves billing. Using SIP signaling, the network gateway receives a call set-up message from the originating SIP client. The call set-up message includes the IP address of the caller, which seems to be a relatively straight-forward way of identifying the entity responsible for paying for the call. Unfortunately, it is relatively easy for fraudulent users with access to a personal computer to insert an incorrect caller identification. Thus, the SIP message itself is not a reliable basis for billing purposes. What is needed is a method for billing SIP phone calls in an efficient way that substantially eliminates fraud.

SUMMARY OF THE INVENTION

The present invention addresses the needs described above. The present invention provides an efficient method for billing phone calls that are placed from SIP enabled devices to telephones connected to the Public Switched Telephone Network (PSTN). The method of the present invention also substantially eliminates fraud.

One aspect of the present invention is a method for placing a call between a first client and a second client. The IP network includes a SIP server and a gateway configured to provide access to a public switched network. The method includes receiving a call request message. The call request message is authenticated to identify an authentic originating client. A database is searched to find a client billing tag corresponding to the authentic originating client. The call is authorized to be completed if the client billing tag is obtained, and is not authorized to be completed if the client billing tag cannot be obtained.

In another aspect, the present invention includes a computer readable medium having computer executable instructions for performing a method for placing a call between a first client in an IP network and a second client in a public switched telephone network. The method includes receiving a call request message. The call request message is authenticated to identify an authentic originating client. A database is searched to find a client billing tag corresponding to the authentic originating client. The call is authorized to be completed if the client billing tag is obtained, and is not authorized to be completed if the client billing tag cannot be obtained.

In another aspect, the present invention includes a computer readable medium having computer executable instructions for performing a method for placing a call between a first client in an IP network and a second client in a public switched telephone network. The method includes receiving a SIP call request message. The call request message is authenticated to identify an authentic originating client. A database is searched to find a client billing tag corresponding to the authentic originating client. The client billing tag is inserted into the call request message. The call request message is transmitted to the gateway after the client billing tag is inserted into the call request message.

In another aspect, the present invention includes a computer readable medium having computer executable instructions for performing a method for placing a call between a first client in an IP network and a second client in a public switched telephone network. The method includes receiving a SIP call request message from the first client. At least one calling feature in a profile of the second client is evaluated. An authentic originating client is determined based on the at least one calling feature. The client billing tag corresponding to the authentic originating client is retrieved. The client billing tag is inserted into the call request message.

In another aspect, the present invention includes a computer readable medium having computer executable instructions for performing a method for placing a call between a first client in an IP network and a second client in a public switched telephone network. The method includes: receiving a SIP call request message; adding a header to the SIP call request message, the header including a server identifier; and transmitting the SIP call request and header to a gateway.

In another aspect, the present invention includes a computer readable medium having computer executable instructions for performing a method for placing a call between a first client in an IP network and a second client in a public switched telephone network, the method includes: receiving a call request message; checking the call request message for the presence of a header appended to the call request message; and completing the call based on the presence of the header.

In another aspect, the present invention includes a system for placing a call between a first client and a second client. The system includes an IP network. A SIP server is coupled to the IP network. The SIP server is configured to process at least one SIP call request message received from the first client to determine an authentic originating client. The SIP server also is configured to obtain a client billing tag corresponding to the authentic originating client. A network gateway is coupled to the SIP server, the network gateway is configured to provide at least one of the first client and the second client conditional access to a public switched telephone network.

In another aspect, the present invention includes a server system for placing a call between a first client in the IP network and a second client in a public switched telephone network. The system includes a database configured to store at least one client billing tag. A processor is coupled to the database. The processor is programmed to: process at least one call request message to identify a authentic originating client; and, search the database to find the client billing tag corresponding to the authentic originating client. The server allows the call to be completed if the client billing tag is obtained, and does not allow the call to be completed if the client billing tag cannot be obtained.

In another aspect, the present invention includes a network gateway system for placing a call between a first client in the IP network and a second client in a public switched telephone network. The system includes a communications interface for establishing a call with a circuit switched network. A processor is coupled to the communications interface. The processor is programmed to: receive at least one call request message; attempt to retrieve a client billing tag from the at least one call request message; and transmit the client billing tag and at least one call statistic to a network management system.

In another aspect, the present invention includes a network gateway system for placing a call between a first client in the IP network and a second client in a public switched telephone network. The system includes a communications interface for establishing a call with a circuit switched network. A processor is coupled to the communications interface. The processor is programmed to: receive a call request message; check the call request message for the presence of a header appended to the call request message; and complete the call based on the presence of the header.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
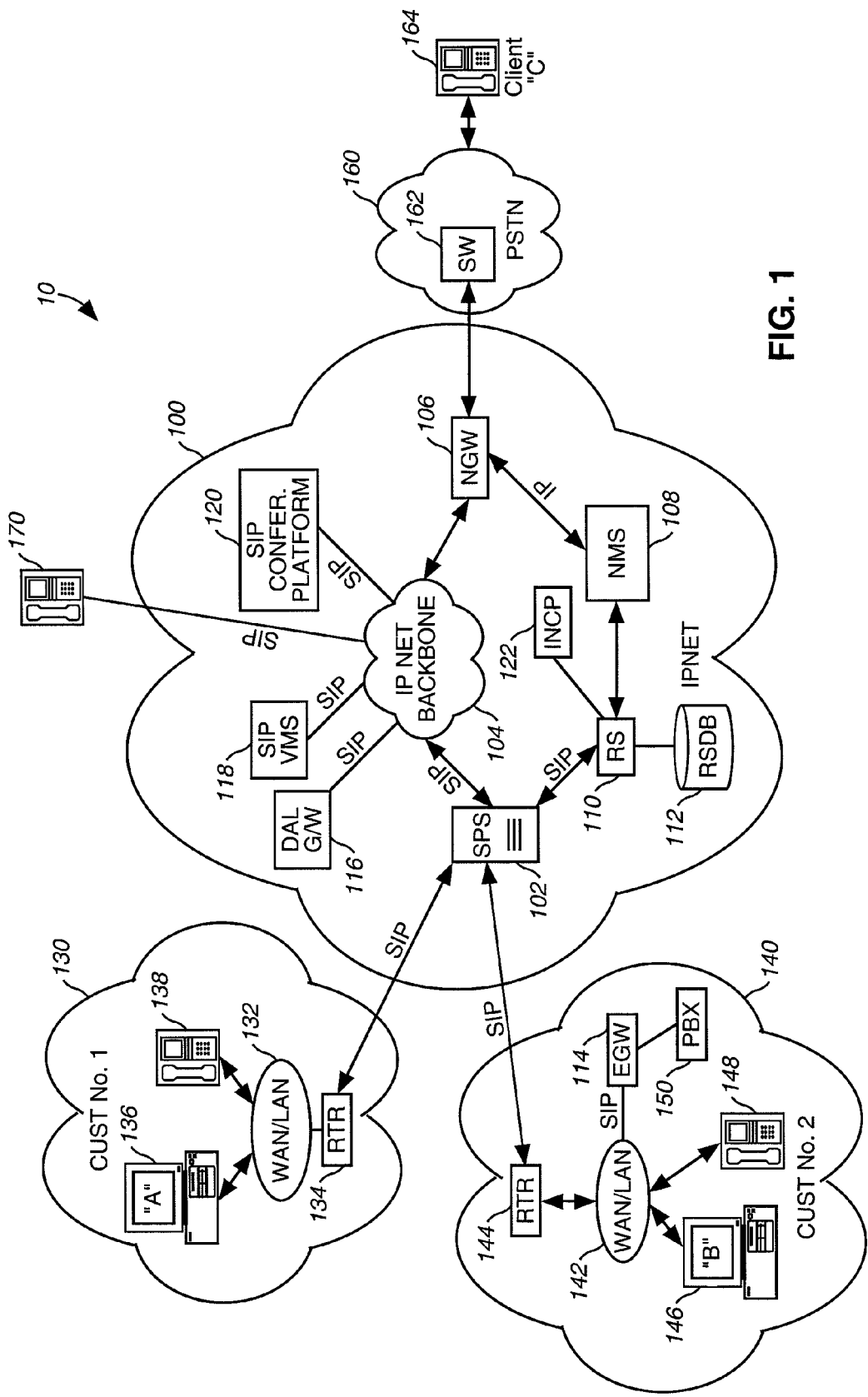
FIG. 1 is a block diagram of an IP network suitable for placing calls from SIP enabled devices to telephones connected to the PSTN in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the network architecture of the present invention is shown in FIG. 1, and is designated generally throughout by reference numeral 10.

In accordance with the invention, the present invention includes a method for placing a call between a first client and a second client. The IP network includes a SIP server and a gateway configured to provide access to a public switched network. The method includes receiving a call request message. The call request message is authenticated to identify an authentic originating client. A database is searched to find a client billing tag corresponding to the authentic originating client. The call is authorized to be completed if the client billing tag is obtained, and is not authorized to be completed if the client billing tag cannot be obtained. Thus, the present invention provides an efficient method for billing phone calls that are placed from SIP enabled devices to a telephone connected to the Public Switched Telephone Network (PSTN). The present invention also substantially eliminates fraud.

As embodied herein, and depicted in FIG. 1, a network 10 suitable for placing calls via an IP network is disclosed. Network 10 includes IP network 100 coupled to enterprise network 130, enterprise network 140, PBX 150, PSTN 160, and SIP phone 170.

IP network 100 includes SIP Proxy Server computer (SPS) 102 coupled to IP network backbone 104 and Redirect Server (RS) 110. RS 110 is coupled to Redirect Server database (RSDB) 112. Network backbone 104 is coupled to network gateway 106, DAL gateway 116, SIP voice mail server 118, SIP conferencing platform 120, and SIP phone 170. INCP gateway 122 is coupled to RS 110. Gateway 106 is connected to PSTN 160 by way of switch 162. Non-SIP telephone 164 is connected to PSTN 160. Gateway 106 is also coupled to Network Management System (NMS) 108. By way of example, enterprise network 130 includes SIP device 136 and SIP device 138 coupled to enterprise WAN/LAN 132. LAN 132 is coupled to enterprise router 134. Also by way of example, enterprise network 140 includes SIP device 146 and SIP device 148 coupled to enterprise WAN/LAN 142. LAN 142 is coupled to enterprise router 144. PBX system 150 is coupled to WAN/LAN 142 by way of enterprise gate 114.

It will be apparent to those of ordinary skill in the pertinent art that modifications and variations can be made to the various elements of network 10 of the present invention. SPS 102, RS 110, network gateway 106, and SIP devices 136, 138, 146, 148, and 170 may be of any suitable type provided that they be in conformance with SIP standards detailed in RFC 2543. SIP is an application layer control and signaling protocol that enables the creation, modification, and termination of sessions between users. SIP is also a client-server protocol. A SIP client is a software client that runs, for example, on a personal computer or a laptop. From a signaling perspective, devices 136 and 146 may operate similarly to SIP phones 138, 148, and 170.

IP network backbone 104 includes a nationwide high speed network that operates at 622 MB/sec (OC-12). Backbone 104 employs advanced packet switching technology commonly known as the Asynchronous Transfer Mode (ATM). Backbone 104 also utilizes a fiber-optic transmission technology referred to as the Synchronous Optical Network (SONET). The combination of ATM and SONET enables high speed, high capacity voice, data, and video signals to be combined and transmitted on demand. The high speed of backbone 104 is achieved by connecting Internet Protocol through the ATM switching matrix, and running this combination on the SONET network.

NMS 108 may be of any suitable type, but there is shown by way of example a distributed computing system that includes customer management, account management, billing, network facilities provisioning, and network data collection functionality. In one embodiment, the computing system is based on technology provided by SUN Microsystems. In another embodiment, the databases employed by the computing system are based on technology provided by ORACLE.

The customer management system provides and controls access to customer accounts. Users may utilize a web page to monitor service, login to their account, and manage certain elements permitted by user profiles. The account management system allows network personnel to establish, maintain, or deactivate customer accounts. In one embodiment, customer information is viewed via a web interface. The billing system processes customer event records, the customer pricing plan data, adjustments, taxation and other data in the preparation of customer invoices. The network facilities provisioning system provides the information required by network engineers to ensure that the appropriate hardware and software is in place to provide service. This may involve the creation of a customer profile, and the reconfiguration of SPS 102, RS 110, and other network elements. Network provisioning may also require the placement of hardware plug-in devices used in backbone 104.

SPS 102 may be of any suitable type, but there is shown by way of example a SIP proxy server that conforms with SIP standards detailed in RFC 2543. SPS 102 functions as both a server and a client for the purpose of making requests on behalf of other clients. SPS 102 may service a request directly or pass it on to another server. SPS 102 may also rewrite a message before forwarding it.

RS 110 may be of any suitable type, but there is shown by way of example a SIP redirect server that conforms with SIP standards detailed in RFC 2543. RS 110 accepts SIP messages, maps the address into one or more new addresses, and returns these addresses to the client, which could be SPS 102. RS 110 does not initiate its own SIP requests, and RS 110 does not accept calls. RS 110 is essentially, a location server where information about possible terminating locations can be obtained.

INCP 122 is an Intelligent Network Control Point that is accessed to obtain dial plan information for existing private network customers. INCP 122 is an additional database that may be queried by RS 110 to route specific private calls. INCP 122 may also be accessed by SPS 102. In another embodiment, RS 110 may query some other legacy system or database for routing information.

PSTN 160 may be of any suitable type, but there is shown by way of example a circuit switched network employing Signaling System No. 7 (SS7). Switch 162 may be a class 3 switch, a class 5 switch, or any suitable switching apparatus. Telephone 164 may be any suitable telephone set currently in use or on the market.

DAL gateway 116 may be of any suitable type, but there is shown by way of example a system configured to support private traffic between IP locations and non-IP locations.

Figure 2:
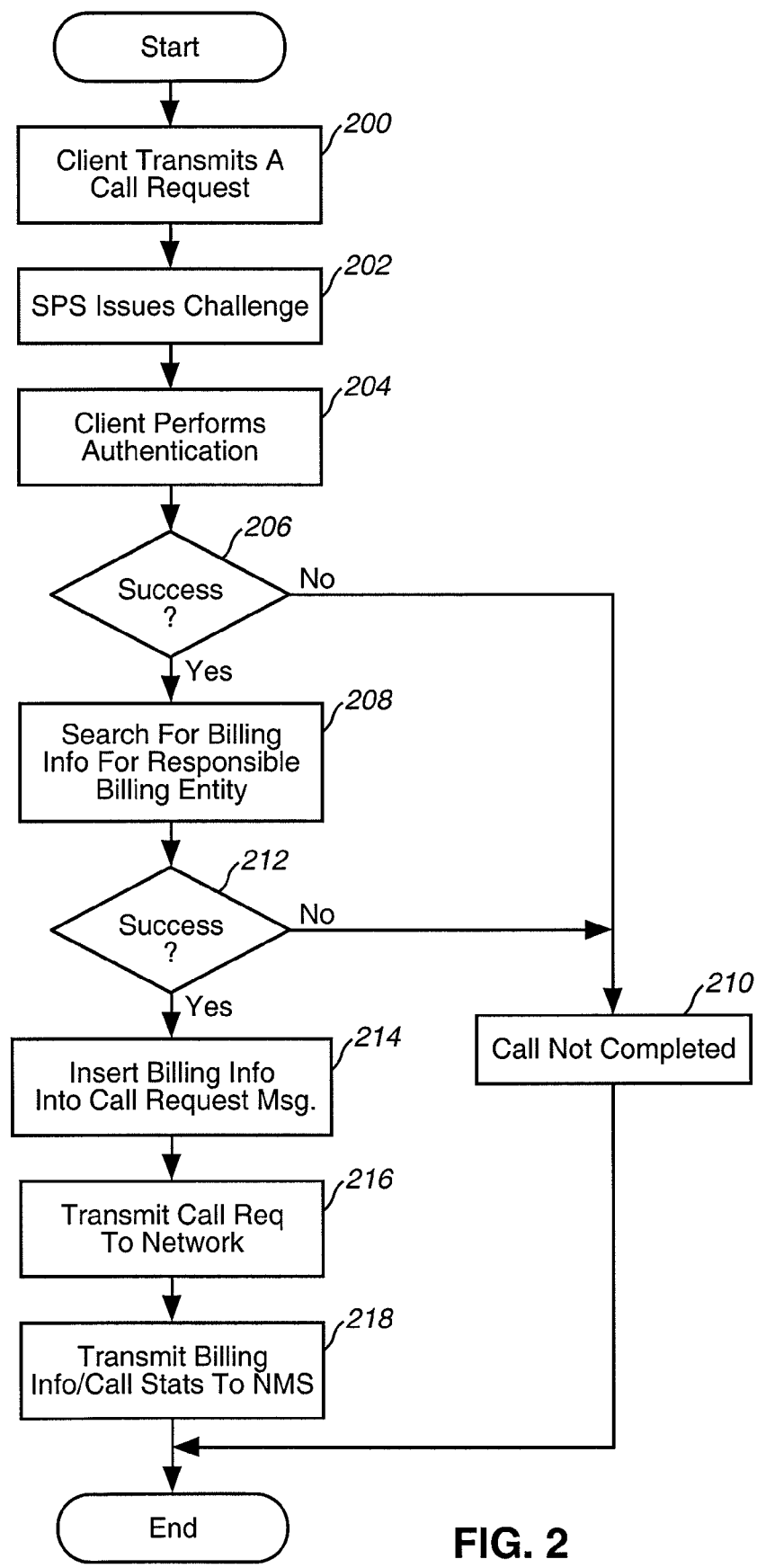
FIG. 2 is a chart showing a method for obtaining correct billing information in accordance with one embodiment of the present invention.

As embodied herein, and depicted in FIG. 2, a chart showing a method for obtaining correct billing information is disclosed. Referring back to FIG. 1, by way of example, an originating user attempts to establish a call from device 136 to a destination user at conventional telephone 164. Device 136 transmits an INVITE message to proxy server 102. Since telephone 164 is not a SIP device, the INVITE message includes the telephone number of telephone 164 and not an URL. In step 202, SPS 102 challenges device 136 to authenticate itself by transmitting a random number. Device 136 employs the random number, its password, and username to calculate an authentication result using the MD5 hash algorithm and transmits the random number, the username (but not the password), and the result to SPS 102.

SPS 102 uses the username to find a matching password in a database, which may or may not be resident on server 102. SPS 102 performs the same calculation using the username and random number provided by client 136, and the password retrieved from the database. If the results match, the originating client at device 136 is authenticated. Once client 136 is authenticated, SPS 102 uses the username and password to find the authentic originating client, e.g., the party responsible for bearing the cost of the call. SPS 102 searches a database to find the client billing tag that corresponds to the authentic originating client. In step 214, SPS 102 inserts the client billing tag into the call request message (INVITE) and subsequently transmits the message to gateway 106 via backbone 104.

At this point, gateway 106 attempts to establish a circuit switched call with telephone set 164 via switch 162. If gateway 106 is successful, an ACCEPT message is transmitted back to device 136, and the call is established. After the call is completed, gateway 106 transmits the client billing tag, the call length, and any other relevant call statistics to NMS 108. Obviously, if the authentication procedure of step 204 fails the call is not authorized to be completed. Likewise, if the client billing tag is not in the database, the call is not authorized to be completed, and the call request message is not passed onto gateway 106. One of ordinary skill in the art will recognize that the method depicted in FIG. 2 can be embodied as computer executable instructions disposed on any computer readable medium such as ROM, RAM, CD-ROM, hard drive or diskette. These instructions can be stored in the read-only memory (ROM) of SPS 102, or they can be stored as a network resource in some other location within network 100.

Figure 3:
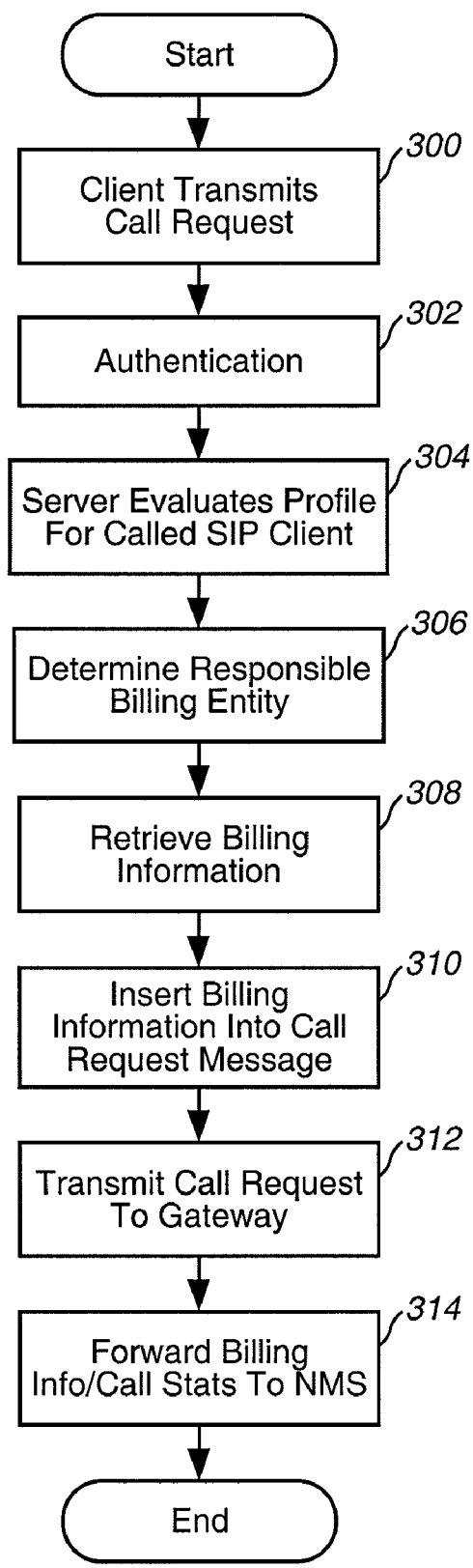
FIG. 3 is a chart showing a method for obtaining correct billing information in accordance with another embodiment of the present invention.

As embodied herein, and depicted in FIG. 3, a chart showing a method for obtaining correct billing information is disclosed. Referring back to FIG. 1, in this example, an originating client at device 136 is attempting to establish a session with a destination user at device 148. Step 300 and 302 are identical to steps 200-206 depicted in FIG. 2. In step 304, SPS 102 evaluates the profile of destination user 148. For a SIP device, a profile typically includes the user's authentication user name, password, account data, and other information. In this context however, the important profile information relates to the call features that are enabled. The features include unconditional call forwarding, conditional call forwarding, find-me, call blocking, call screening, alias management, password change, and default address management. In this example, a call forwarding feature is enabled, directing SPS 102 to forward the call to telephone set 164.

In this case, since the destination user is requesting that a call be established with telephone set 164 via PSTN 160, the destination user should bear the cost of the call. SPS 102 obtains the user name and password associated with device 148 from the profile, and uses the username and password to find the authentic originating client, e.g., the party responsible for bearing the cost of the call. SPS 102 searches a database to find the client billing tag that corresponds to the authentic originating client. In step 310, SPS 102 inserts the client billing tag into the call request message (INVITE) and transmits the message to gateway 106, via backbone 104. At this point, gateway 106 attempts to establish a circuit switched call between client 126 and telephone set 164. If gateway 106 is successful, an ACCEPT message is transmitted back to device 136, and the call is established. After the call is completed, gateway 106 transmits the client billing tag, the call length, and any other relevant call statistics to NMS 108.

One of ordinary skill in the art will recognize that the method of depicted in FIG. 3 can be embodied as computer executable instructions disposed on any computer readable medium, such as ROM, RAM, a CD-ROM, a hard drive or a diskette. These instructions can be stored in the read-only memory map (ROM) of SPS 102, or they can be stored as a network resource within network 100.

Those of ordinary skill in the art will recognize that billing tags can be added for all call types processed by server 102. Calls placed between all or any combinations of SIP-phones, enterprise gateways, network gateways, DAL gateways, INCP gateways, SIP-voicemail servers, and SIP conferencing servers may employ the present invention. Those of ordinary skill in the art will also recognize that the present invention can be employed using any suitable type of transport network. Further, the present invention is applicable to any type of session that may be established including, but not limited to, telephony, video, audio, instant messaging, and etcetera. It is also contemplated that the present invention may be employed for billing purposes, in a wide variety of services offered by the network. These services include, but are not limited to, call return, call forwarding, caller ID, caller waiting, call blocking, and especially any service that may be charged on a per-call basis.

Figure 4:
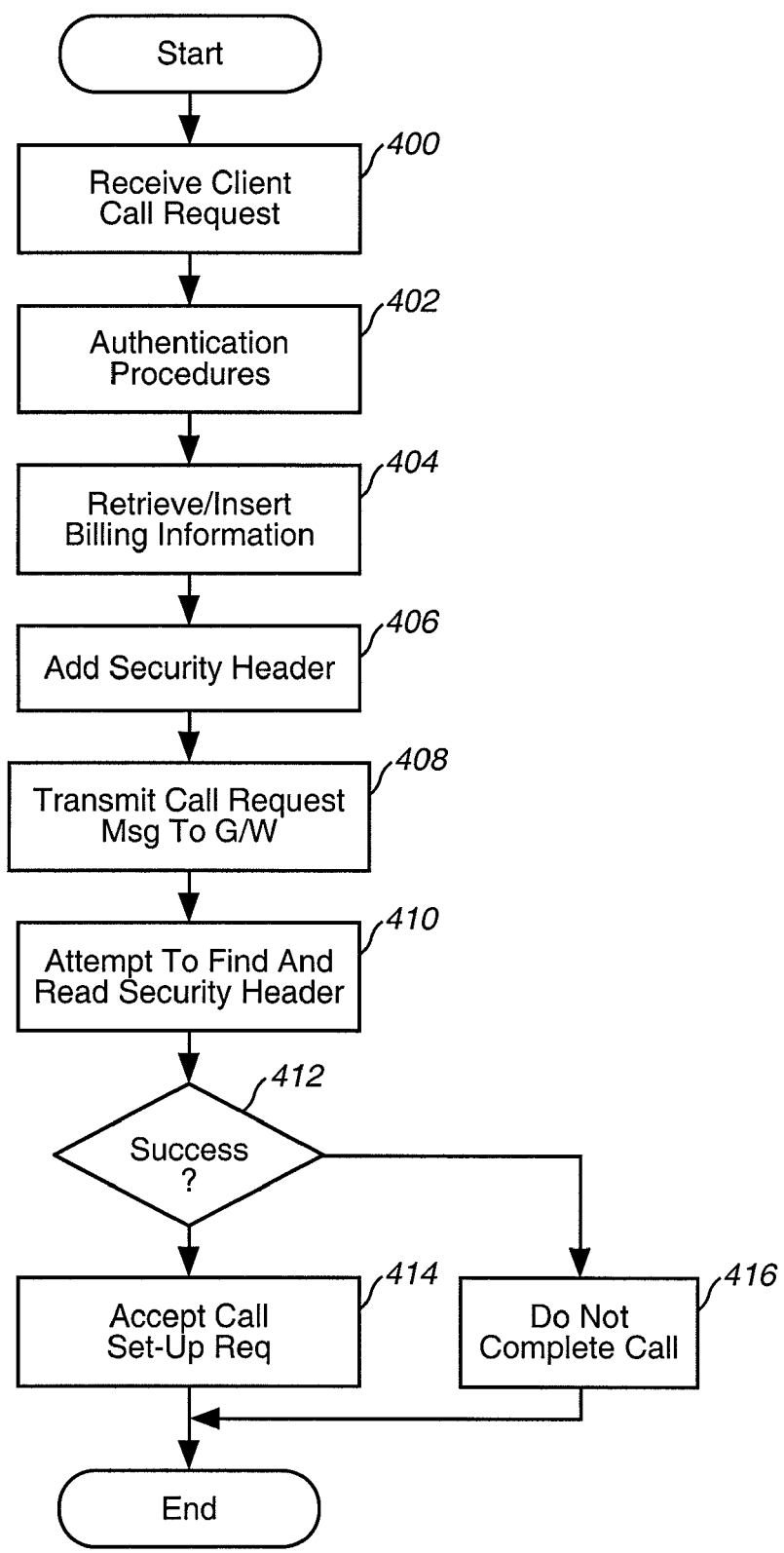
FIG. 4 is a chart showing a method for ensuring that calls are placed by a network gateway only after being processed by a network SIP server in accordance with yet another embodiment of the present invention.

As embodied herein, and depicted in FIG. 4, a chart showing a method for placing calls by a network gateway is disclosed. In FIG. 4, steps 400-404 are substantially the same as steps 200-214 depicted in FIG. 2. Unfortunately, these steps do not address the scenario wherein a fraudulent user attempts to contact the gateway directly, to thereby avoid bearing the cost of the call. Other measures are required to prevent this type of fraud. Thus, in step 406, SPS adds a security header to the INVITE message. The security header is used to identify SPS 102 as the server sending the INVITE message. In step 408, SPS 102 transmits a message containing both the INVITE request and the header to gateway 106. Gateway 106 is configured to look for the header before processing the call request. If gateway 106 cannot find the header, or if the header cannot be successfully read, gateway 106 does not attempt to complete the call. If gateway 106 can read the header, gateway 106 attempts to establish the call between client 136 and telephone set 164. One of ordinary skill in the art will recognize that the method depicted in FIG. 4 can be embodied as computer executable instructions disposed on any computer readable medium such as ROM, RAM, a CD-ROM, a hard drive or a diskette. These instructions can be stored in the read-only memories of SPS 102 and gateway 106, or they can be stored as a network resource located within network 100.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method, comprising:
   receiving, from a first session initiation protocol (SIP) device, a SIP call request message for establishing a call with a second SIP device;
   identifying a profile associated with the second SIP device;
   identifying, within the profile, a call forwarding feature that is enabled for the second SIP device and that identifies a non-SIP device to which the call is to be forwarded;
   identifying, based on the call forwarding feature, an authentic originating client as a party responsible for paying for the call;
   searching a database to identify a client billing tag that corresponds to the authentic originating client; and
   modifying the SIP call request message to include the client billing tag when the database includes the client billing tag.

2. The method of claim 1, where the call feature includes one of unconditional call forwarding, conditional call forwarding, or find-me.

3. The method of claim 1, further comprising:
   establishing a circuit-switched call connection to the non-SIP device; and
   notifying the first SIP device that the circuit-switched call connection has been established.

4. The method of claim 1, further comprising:
   determining that the database does not include the client billing tag; and
   denying the call when the database does not include the client billing tag.

5. The method of claim 1, further comprising:
   detecting completion of the call; and
   outputting the client billing tag and information regarding a length of the call after detecting the completion of the call.

6. The method of claim 1, further comprising:
   identifying authentication information from the profile; and
   authenticating the first SIP device based on the authentication information.

7. The method of claim 1, further comprising:
   adding a security header to the SIP call request message, the security header identifying a server that transmitted the SIP call request message.

8. The method of claim 7, further comprising:
   determining whether the SIP call request message includes the security header;

attempting to establish the call when the SIP call request message includes the security header; and not attempting to establish the call when the SIP call request message does not include the security header.

9. A computer-readable medium having computer executable instructions for performing a method for placing a call between a first session initiation protocol (SIP) device and a second SIP device, the computer-readable medium comprising:

one or more instructions to receive, from the first SIP device, a SIP call request message for establishing a call with the second SIP device;

one or more instructions to identify a call feature that is enabled for the second SIP device, the call feature identifying a non-SIP device to receive the call;

one or more instructions to identify, based on the identified call feature, a party associated with the second SIP device as a party responsible for paying for the call only when the identified call feature identifies the non-SIP device to receive the call;

one or more instructions to determine whether a database includes a client billing tag that corresponds to the party associated with the second SIP device;

one or more instructions to permit the call to be established when the database includes the client billing tag; and one or more instructions to deny the call when the database does not include the client billing tag.

10. The computer-readable medium of claim 9, where the call feature includes one of unconditional call forwarding, conditional call forwarding, or find-me.

11. The computer-readable medium of claim 9, where the one or more instructions to permit the call to be established include:

one or more instructions to insert the client billing tag into the SIP call request message, and one or more instructions to output the SIP call request message with the inserted client billing tag.

12. The computer-readable medium of claim 9, further comprising:

one or more instructions to establish a circuit-switched call connection to the non-SIP device; and one or more instructions to notify the first SIP device that the circuit-switched call connection has been established.

13. The computer-readable medium of claim 9, further comprising:

one or more instructions to detect completion of the call; and one or more instructions to output the client billing tag and information regarding a length of the call after detecting the completion of the call.

14. A system, comprising:

a SIP server to:

receive a SIP call request message that requests that a call be established from a first SIP device to a second SIP device, identify a calling feature that is enabled for the second SIP device, the calling feature identifying a non-SIP device to receive one or more calls intended for the second SIP device, determine an authentic originating client based on the calling feature, obtain a client billing tag that identifies the authentic originating client as a party responsible for paying for the call; and a network gateway, coupled to the SIP server, to provide at least one of the first SIP device or the second SIP device conditional access to a public switched telephone network.

15. The system of claim 14, where the network gateway comprises:

a communications interface to establish the call with the public switched network; and a processor, coupled to the communications interface, to:

receive the SIP call request message from the SIP server, check the SIP call request message for an existence of a security header appended to the SIP call request message, the security header including a server identifier identifying the SIP server as the server that sent the SIP call request message to the network gateway, and establish the call based on the existence of the security header including the server identifier.

16. The system of claim 15, where the processor is programmed to establish the call when the security header exists.

17. The system of claim 16, where the processor is programmed to not establish the call when the security header does not exist.

18. The system of claim 14, where the SIP server is to:

forward the SIP call request message to the network gateway if the client billing tag is obtained, and not forward the call request message to the network gateway if the client billing tag cannot be obtained.

19. The system of claim 14, where the SIP server is to:

insert the client billing tag into the SIP call request message, and transmit the call request message with the client billing tag to the network gateway.

* * * * *